(No Model.)  S. B. RICKERSON.  3 Sheets—Sheet 1.
ROLLER MILL.

No. 278,274.  Patented May 22, 1883.

(No Model.)

S. B. RICKERSON.
ROLLER MILL.

No. 278,274.

3 Sheets—Sheet 2.

Patented May 22, 1883.

Attest:
F. W. Howard
F. T. Chapman

Inventor:
S. B. Rickerson
by W. H. Doolittle
Att.

(No Model.)

S. B. RICKERSON.
ROLLER MILL.

No. 278,274. Patented May 22, 1883.

Attest:
F. W. Howard
J. M. Blackwood

Inventor:
Sherman B. Rickerson
by W. M. Doolittle
Attorney

UNITED STATES PATENT OFFICE.

SHERMAN B. RICKERSON, OF GRAND RAPIDS, MICHIGAN.

ROLLER-MILL.

SPECIFICATION forming part of Letters Patent No. 278,274, dated May 22, 1883.

Application filed February 12, 1883. (No model.)

*To all whom it may concern:*

Be it known that I, SHERMAN B. RICKERSON, a citizen of the United States, residing at Grand Rapids, in the county of Kent and State of Michigan, have invented certain new and useful Improvements in Roller-Mills; and I do hereby declare the following to be a full, clear, and exact description of the invention, such as will enable others skilled in the art to which it appertains to make and use the same.

My invention relates to an improvement in the art of milling, and concerns especially that class of mills in which the grain is reduced by a set or series of rolls from the whole grain to flour or nearly to flour.

The object of my invention is to draw from the rolls and entirely carry away the heated air and moisture as it arises from the broken grain and flour during grinding; and it consists in the means for drawing the heated air and moisture from the rolls at a point behind and on or nearly on the plane of the axes of the rolls, and in a certain special improvement in the means for accomplishing that result. The means in the present instance consist of a slotted cylinder, in combination with an exhaust device and the grinding-rolls.

Figure 1:
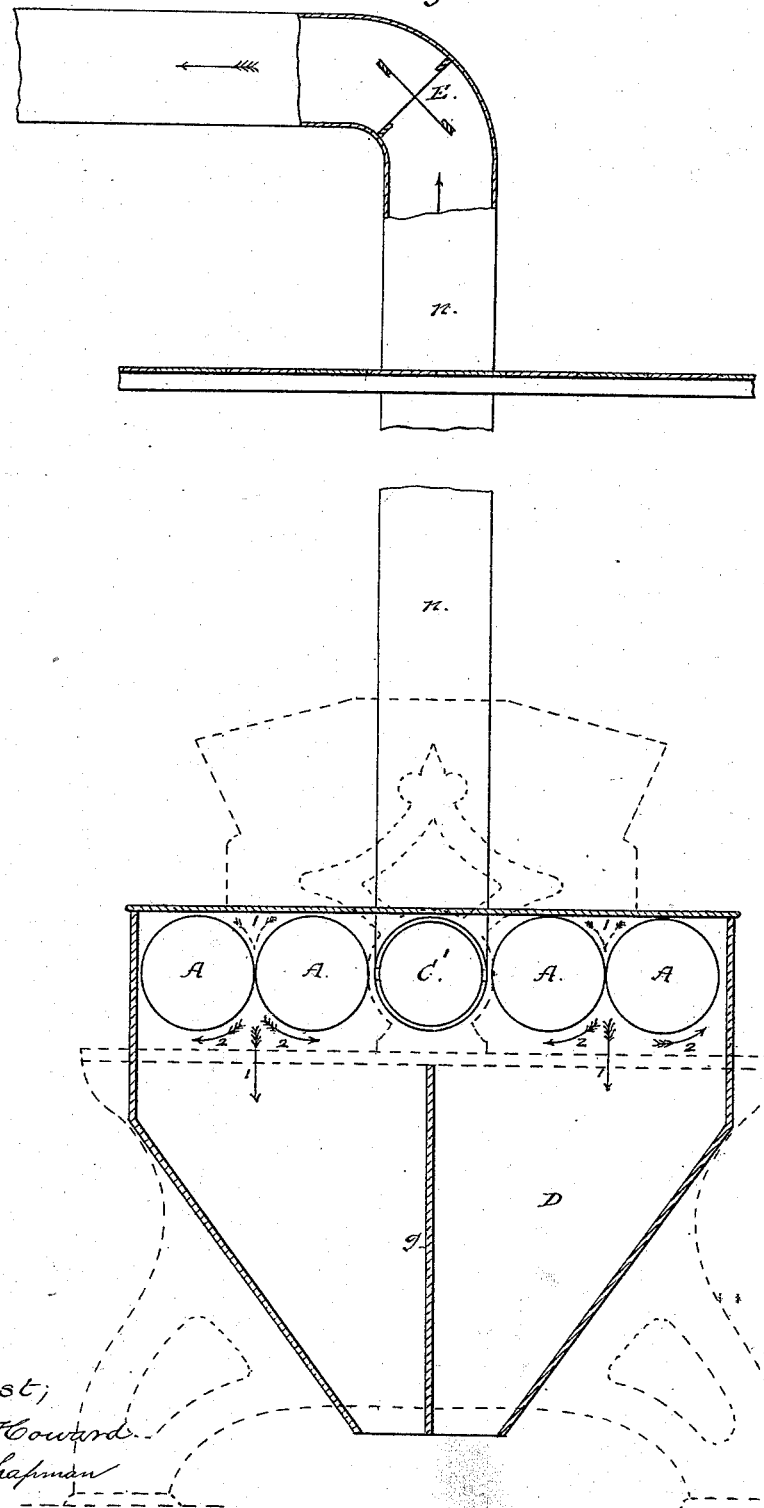
Figure 2:
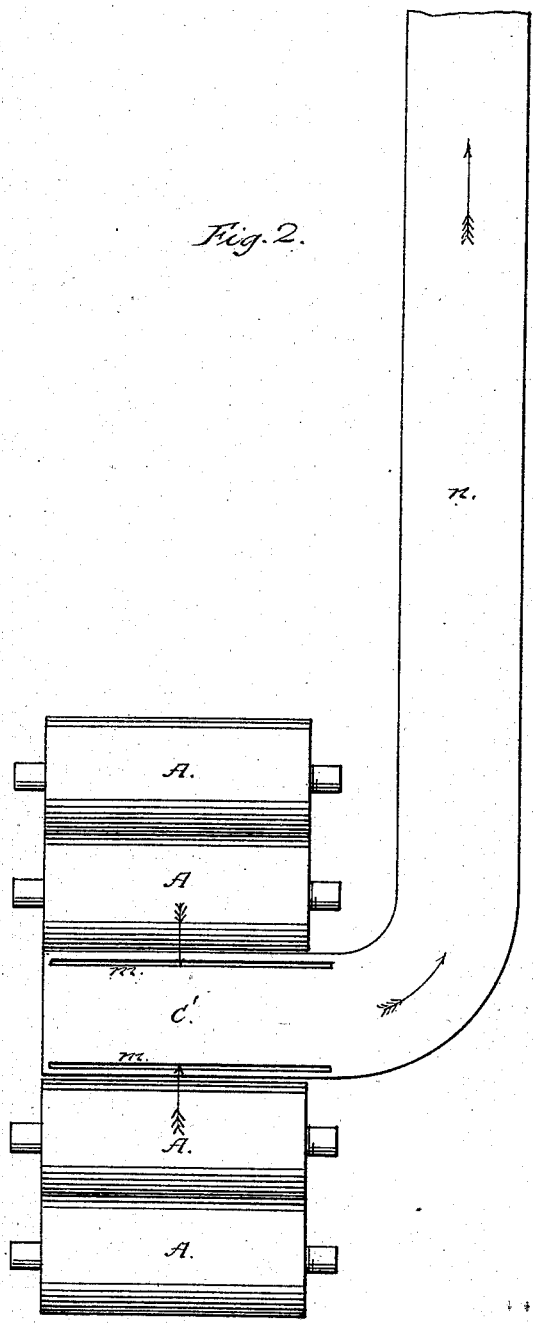
Figure 3:
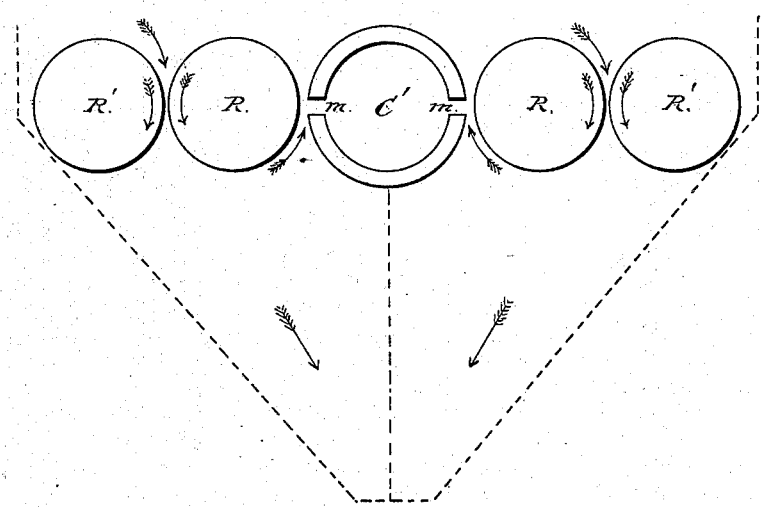
Figure 4:
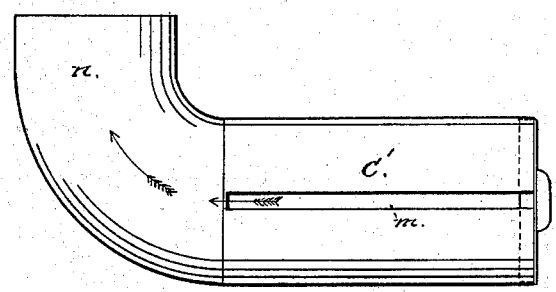

My improvement is illustrated in the accompanying drawings, in which Figure 1 is an end elevation, partly in section, of a portion of a mill, showing my improvement in connection therewith; Fig. 2, a plan view of the rolls, a slotted cylinder, and an exhaust-pipe; Fig. 3, an end view of two sets of rolls with the slotted cylinder located between them; and Fig. 4 is a detached view of the said slotted cylinder and a pipe attached thereto for carrying off the moist and heated air.

In the apparatus shown the grain passes down between the revolving rolls A A A A in the direction of the arrows in Fig. 1, and carries with it more or less air, which becomes heated by the friction of the rollers upon the grain and also laden with moisture escaping from the cracked grain. If not at once removed, the flour in the chamber D becomes filled with heated moisture, which absorbs much of the fine dust, dampens the flour, and thus deteriorates it in quality and delays its immediate use. The motion of the grinding-rolls tends to direct the current of heated air to the back of the rolls, as indicated by the arrows 2, beneath the rolls in Fig. 1, while the grain and dust fall to the bottom of the chamber, as indicated by the arrows 1. After observation of this tendency of the heated air to pass to the back of the rolls, and after careful experiment, I have found that the heated air and its accompanying moisture can be better carried away, without carrying flour with it, by placing at the back of the rolls, and at a point directly on or nearly on the line of the plane of the axes of the rolls, any suitable pipe or other device which, with the aid of an exhaust device, will draw in the air at that point.

In the drawings, C' represents the cylinder mentioned, having a narrow slot or slots, *m*, extending the whole or nearly the whole length of the cylinder. In Fig. 1 this cylinder is shown as resting within a frame, which frame is indicated in dotted lines, and between the two sets of rolls A A A A, and, with the said rolls, is surrounded by the usual form of tight box, D, into which the cracked grain or flour falls on either side of a partition, *g*. When the cylinder is in position in the mill, the slot of the cylinder runs along close to and nearly the entire length of the back of the grinding-roll, and at a point near or about its center. *n* represents the pipe for carrying off the heated and moisture-laden air. It is connected to one end of the cylinder, and, as shown in Fig. 1, extends to an apartment above the one in which the rolls are located, and is there combined with a fan, E, or other suitable exhaust. To a considerable extent a natural draft is created through the pipe *n*; but the additional aid of an exhaust device is necessary to produce sufficient draft to carry entirely away the heat and moisture; or, as shown in Fig. 2, the pipe may be carried off to one side of the rolls, or it may be carried in any other direction producing the same result, and there connected with a suitable exhaust. The end of the cylinder opposite to the exhaust-pipe is closed, and may be provided with a damper to increase or regulate the draft.

The rolls are operated by any well-known arrangement of pulleys, which are therefore not herein shown and described.

It is essential to my invention that the cylinder should extend within the casing, and the slot or opening be placed at a point at the back of the rolls and along a line with the plane of their axes; but it is not necessary that it should be placed between the rolls, as a cylinder slotted on one side may be placed at the back of each one or more rolls, and connected to the exhaust-pipe by suitable tubes or pipes leading thereto. Nor is the use of my improvement, as already intimated, confined to any particular number of rolls.

My improvement, while adding very little to the expense in the construction of a mill, carries off the heat and steam from the flour, thereby more thoroughly curing it and rendering it ready for immediate packing and shipping.

I am aware that it is old to withdraw flour and dust generally, and hot and moistened air incidentally, from the casings of rolls by means of tubes, &c., which communicate with a common exhaust; but my improvement is restricted to the single purpose of drawing off the moist and heated air, and to means for accomplishing that purpose placed at a particular point adjacent to the rolls, so that the hot, moist air alone will be drawn from the rolls, while the flour falls, as usual, to the floor of the casing.

What, therefore, I claim, and desire to secure by Letters Patent, is—

1. In a mill, the combination, with the rolls, of suitable means for drawing and carrying away the heated and moistened air from the rolls at a point directly adjacent to and at the back of the rolls, and substantially on a line with the plane of their axes, substantially as described.

2. In a roller-mill, a slotted cylinder, in combination with the rolls, and a suitable exhaust device, whereby the heated and moistened air from the cracked grain is carried directly from the rolls and into and out of said cylinder, substantially as described.

In testimony whereof I affix my signature in presence of two witnesses.

SHERMAN B. RICKERSON.

Witnesses:
J. H. BLACKWOOD,
JOHN W. SIMS.